United States Patent
Zamir et al.

(10) Patent No.: US 12,430,423 B2
(45) Date of Patent: Sep. 30, 2025

(54) AUTOMATED GENERATION OF LABELED TRAINING DATA

(71) Applicant: INTERNATIONAL BUSINESS MACHINES CORPORATION, Armonk, NY (US)

(72) Inventors: Amos Zamir, Beer Shevav (IL); Yair Allouche, Dvira (IL); Aviad Cohen, Meitar (IL); Ravid Sagy, Beit Yizhack (IL)

(73) Assignee: International Business Machines Corporation, Armonk, NY (US)

( * ) Notice: Subject to any disclaimer, the term of this patent is extended or adjusted under 35 U.S.C. 154(b) by 472 days.

(21) Appl. No.: 18/049,650

(22) Filed: Oct. 26, 2022

(65) Prior Publication Data

US 2024/0143737 A1    May 2, 2024

(51) Int. Cl.
*G06F 21/53* (2013.01)
*G06F 21/54* (2013.01)

(52) U.S. Cl.
CPC .............. *G06F 21/54* (2013.01); *G06F 21/53* (2013.01); *G06F 2221/034* (2013.01); *G06F 2221/2101* (2013.01)

(58) Field of Classification Search
None
See application file for complete search history.

(56) References Cited

U.S. PATENT DOCUMENTS

| 10,846,141 | B1 * | 11/2020 | Hermoni | G06F 21/566 |
| 11,429,713 | B1 * | 8/2022 | Donovan | H04L 63/1458 |
| 2017/0006055 | A1 * | 1/2017 | Strom | G06F 30/20 |
| 2018/0239902 | A1 * | 8/2018 | Godard | G06F 21/53 |

(Continued)

FOREIGN PATENT DOCUMENTS

| EP | 4152729 A1 * | 3/2023 | .......... H04L 51/212 |
| KR | 102405799 B1 | 6/2022 | |
| KR | 20220073657 A | 6/2022 | |

OTHER PUBLICATIONS

"Caldera, A Scalable, Automated Adversary Emulation Platform", MITRE, Downloaded from the Internet on Aug. 24, 2022, 3 pgs., <https://caldera.mitre.org/>.
Know, Control, and Optimize Your Cybersecurity Posture, Cymulate, Downloaded on Aug. 24, 2022, 10 pgs., <https://cymulate.com/>.
"Leverage the Attack to Improve your Defenses", SafeBreach, Downloaded on Aug. 24, 2022, 7 pgs., <https://www.safebreach.com/>.

(Continued)

*Primary Examiner* — Joseph P Hirl
*Assistant Examiner* — Hassan Saadoun
(74) *Attorney, Agent, or Firm* — Eric W. Chesley (57) ABSTRACT

Described are techniques for automated generation of labeled datasets for training an AI model to identify a cyberattack. The techniques include receiving configuration information for simulating a cyberattack against a target computer network. The techniques further include executing a cyberattack simulation, based on the configuration information, against the target computer network, where one or more attack log files containing information related to the cyberattack simulation are generated by resources of the target computer network in response to the cyberattack simulation. The techniques further include generating labeled training data from the one or more attack log files to correspond to specifications of the target computer network, and training an artificial intelligence (AI) model to identify the cyberattack in the target computer network using the labeled training data.

20 Claims, 6 Drawing Sheets

(56) References Cited

U.S. PATENT DOCUMENTS

| | | | |
|---|---|---|---|
| 2019/0258953 A1* | 8/2019 | Lang | G06N 3/08 |
| 2021/0320941 A1 | 10/2021 | E Silva et al. | |
| 2022/0329630 A1* | 10/2022 | Li | G06F 21/577 |

OTHER PUBLICATIONS

"QRadar Events and Flows", IBM QRadar Security Intelligence Platform 7.3.2, Documentation, IBM, Last Updated: Apr. 15, 2021, 6 pgs., <https://www.ibm.com/docs/en/qsip/7.3.2?topic=overview-qradar-events-flows>.

"What Are the Top EdTech Tools for Personalized Learning?", Extreme, May 4, 2021, 6 pgs., <https://www.extremenetworks.com/extreme-networks-blog/what-are-the-top-edtech-tools-for-personalized-learning/>.

Anagnostopoulos., Abstract Only Provided, "Chapter 10: Weakly Supervised Learning: How to Engineer Labels for Machine Learning in Cyber-Security", Security Science and TechnologyData Science for Cyber-Security, 2022 World Scientific Publishing Co. Pte Ltd., <https://doi.org/10.1142/9781786345646_010>, 2 pgs.

Bowen, et al., "Enabling Reproducible Cyber Research—Four Labeled Datasets", MILCOM 2016, 2016 IEEE Military Communications Conference, 6 pgs, <doi: 10.1109/MILCOM.2016.7795383>.

Cohen, F., "Simulating Cyber Attacks, Defences, and Consequences", Computers & Security, 18.6 (1999), 40 pgs, <https://doi.org/10.1016/S0167-4048(99)80115-1>.

Disclosed Anonymously, "Method and System for Auto-Adapting Workflow in Application Landscape Based on Cyber Security Vulnerability Scan Result", An IP.com Prior Art Database Technical Disclosure, IP.com No. IPCOM000268414D, IP.com Electronic Publication Date: Jan. 30, 2022, 5 pgs.

Kavak, "Simulation for cybersecurity: state of the art and future directions", Journal of Cybersecurity, Jan. 22, 2021, 13 pgs., doi: 10.1093/cybsec/tyab005.

Kim, et al., "Automated Dataset Generation System for Collaborative Research of Cyber Threat Analysis", Wiley, Hindawi, Security and Communication Networks, vol. 2019, Article ID 6268476, 10 pages, <https://doi.org/10.1155/2019/6268476>.

Peng, et al., Personalized Adaptive Learning: An Emerging Pedagogical Approach Enabled by a Smart Learning Environment, Smart Learn, Environ, 6, 9, Sep. 18, 2019, 14 pgs., <https://doi.org/10.1186/s40561-019-0089-y>.

Wagner, D., "4 Adaptive Math Tools for Personalized Learning", Common Sense Education, Feb. 9, 2016, 6 pgs., <https://www.commonsense.org/education/articles/4-adaptive-math-tools-for-personalized-learning>.

Thomas et al., "Usefulness of DARPA Dataset for Intrusion Detection System Evaluation", Data Mining, Intrusion Detection, Information Assurance, and Data Networks Security, vol. 6973. SPIE, 2008, 8 pages.

* cited by examiner

AUTOMATED GENERATION OF LABELED TRAINING DATA

BACKGROUND

The present disclosure relates to artificial intelligence (AI) based cyber security, and, more specifically, to automated generation of labeled datasets for training an AI model to identify a cyberattack.

Cyberattacks are becoming more frequent and sophisticated, introducing ever greater challenges to organizations protecting their systems and data from various threat actors. These threat actors are often highly motivated, persistent, and well-funded and can use a variety of tactics, techniques, and procedures to commit attacks that result in financial fraud, disruption of services, compromised systems, or theft of sensitive information. State-of-art rule-based solutions fail to follow the ever changing and highly sophisticated cyber threat landscape. Therefore, many organizations implement data driven artificial intelligence (AI) models to detect, analyze, and respond to known and unknown cyber threats.

SUMMARY

Aspects of the present disclosure are directed toward a computer-implemented method comprising receiving configuration information for simulating a cyberattack against a target computer network. The computer-implemented method further comprises executing a cyberattack simulation, based on the configuration information, against the target computer network, where one or more attack log files containing information related to the cyberattack simulation are generated by resources of the target computer network in response to the cyberattack simulation. The computer-implemented method further comprises generating labeled training data from the one or more attack log files to correspond to specifications of the target computer network, where log records from the one or more attack log files matching the specifications of the target computer network are labeled to indicate an association with the cyberattack. The computer-implemented method further comprises training an artificial intelligence (AI) model to identify the cyberattack in the target computer network using the labeled training data.

Additional aspects of the present disclosure are directed to systems and computer program products configured to perform the methods described above. The present summary is not intended to illustrate each aspect of, every implementation of, and/or every embodiment of the present disclosure.

BRIEF DESCRIPTION OF THE DRAWINGS

The drawings included in the present application are incorporated into and form part of the specification. They illustrate embodiments of the present disclosure and, along with the description, serve to explain the principles of the disclosure. The drawings are only illustrative of certain embodiments and do not limit the disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure are directed toward automated generation of labeled datasets for training an AI model to identify a cyberattack. While not limited to such applications, embodiments of the present disclosure may be better understood in light of the aforementioned context.

Data driven artificial intelligence (AI) models can be used to detect, analyze, and respond to known and unknown cyber threats. However, quality datasets are needed to effectively train these AI models to identify cyber threats. One key aspect of quality training data is data labeling. In machine learning, data labeling is the process of identifying raw data (e.g., data that has not been processed for use) and adding one or more informative labels to provide context to the raw data. These labeled datasets are used in supervised machine learning to train AI models to classify data or predict outcomes accurately, and used in unsupervised machine learning to evaluate AI model performance and to optimize the AI model's hyperparameters.

In the past, obtaining quality labeled datasets has been challenging because creating labeled datasets has required expensive and continuous human effort which has been prone to a high number of labeling errors. For example, obtaining labeled data in the security domain has faced challenges with data availability, reliability, lack of diversity, and accuracy. Previously, the main methods of labeled dataset generation have been analysts' feedback, pen testing, and publicly available datasets.

Advantageously, aspects of the present disclosure overcome these challenges by generating labeled training data using an automated process that simulates a cyberattack against a target computing network (e.g., an organization's enterprise network), which in response generates attack data (e.g., log files), which is used to create the labeled training data. Simulating a cyberattack against the resources (or replicated resources) of an organization's computer network and using the attack data (e.g., attack log files) generated by the resources during the simulated cyberattack to generate labeled training data produces accurate labeling of the data, which potentially has a higher accuracy than what is recommended by various information security organizations, such as the MITRE organization.

More specifically, aspects of the present disclosure simulate a cyberattack against a target computer network to cause the resources in the target computer network (e.g., physical and virtual components) to generate attack log files containing information related to the cyberattack. The simulated cyberattack can be executed against actual resources of the target computer network (resources of the actual functioning organization network), or against replicated resources of the target computer network contained in an isolated environment. In some embodiments, breach and attack simulation (BAAS) tools can be used to simulate the cyberattack against the target computer network to ensure that up-to-date tactics are used to simulate the cyberattack. After simulating the cyberattack against the target computer network, aspects of the present disclosure then generate labeled training data from the attack log files generated by the resources of the target computer network. Log records that correspond to the specifications of the target computer network are obtained from the attack log files and the log records are labeled to indicate an association with the cyberattack. Thereafter, aspects of the present disclosure use the labeled training data to train an AI model to identify the cyberattack in the target computer network.

Accordingly, aspects of the present disclosure improve upon prior AI learning systems for cyber security by generating accurately labeled datasets for training AI models to detect cyber threats. Accurately labeled datasets that match an organization's computer network facilitate adaptive AI model training, which optimally fits the AI model to the organization's computer network and improves the ability of the AI model to detect, analyze, and respond to cyber threats. These aspects increase the robustness of cyber threat detection inside a network using tools that simulate attacks from outside a network, to strengthen an existing AI model that monitors a network's health status from within, that is behind all existing fire walls and protection mechanism of the network. This is achieved by the system without ever "irritating" the network itself, by "translating" how an external attack would look from the inside and adding a layer to the existing monitoring AI model with the signs of these attacks. As such, the preservation of information about the external attack and its transformation is captured in labeled data that describe the way the attack is manifested inside the network, thus enriching AI monitoring with the labeled data. Other advantages of the present disclosure not specifically described above will become clear in the discussion below.

Figure 1:
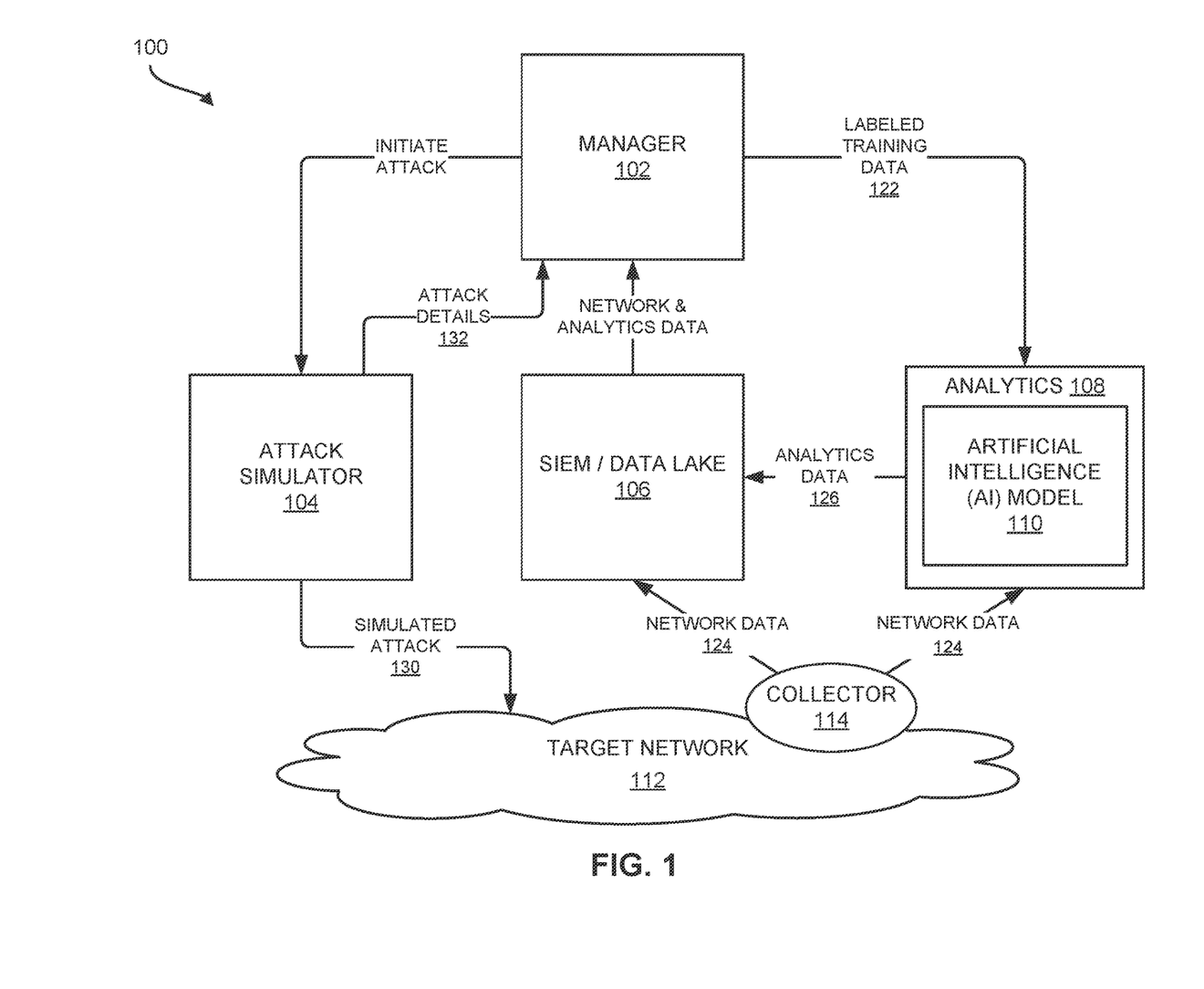
FIG. 1 is a block diagram illustrating an example computational environment implementing an AI learning system that simulates cyberattacks to generate labeled training data, in accordance with some embodiments of the present disclosure.

Referring now to the figures, FIG. 1 illustrates a block diagram of an example AI learning system 100 that executes cyberattack simulations against a target network 112 (target computer network) to generate labeled training data 122, in accordance with some embodiments of the present disclosure. An example of a computing environment in which the AI learning system 100 can be implemented is shown and described later in association with FIG. 6.

The AI learning system 100 uses artificial intelligence to reinforce cybersecurity practices and minimize cyberattacks within a target network 112, such as an organization's enterprise computer network. As shown, the AI learning system 100 includes base components of a collector 114 and analytics 108. The collector 114 obtains network data 124 (e.g., log files) from the network infrastructure (e.g., switches and routers) of the target network 112 and provides the network data 124 to the analytics 108. The network data 124 can contain information about usage patterns, activities, and operations within the target network 112. The network data 124 can show whether resources in the target network 112 are performing properly and optimally, exposing possible anomalous events. The network data 124 can be automatically generated by the resources of the target network 112 whenever an event with a specific classification takes place in the target network 112.

The analytics 108 is configured to ingest the network data 124 from the collector 114 and analyze the network data 124 using an AI model 110 to detect characteristics of a cyber threat and respond to the cyber threat. The AI model 110 works by learning from past network data to identify patterns and trends, and utilizes this information to make predictions about future attacks. In particular, the AI model 110 can be trained to detect cyber threats using labeled training data 122, as is described in detail below.

In addition to providing the network data 124 to the analytics 108, in some embodiments, the collector 114 also provides the network data 124 to a security information and event management (SIEM) and/or data lake 106 component of the AI learning system 100. In embodiments where the SIEM and/or data lake 106 refers to a SIEM, the SIEM supports threat detection, compliance, and security incident management through the collection and analysis (both near real time and historical) of network data 124. The SIEM performs network data aggregation, such as aggregation of log data from a plurality of sources, including networks, security, servers, databases, applications, providing the ability to consolidate monitored data. The SIEM can employ long-term storage of historical data to facilitate correlation of network data 124 over time for the use in forensic investigations to discover network breaches. Alternatively, or in addition to, in some embodiments, SIEM or data lake 106 refers to a data lake, and in such embodiments, the collector 114 sends network data 124 to the data lake. The data lake comprises a system or repository of native or raw data, including network data 124, used for advanced analytics and machine learning.

As shown, the AI learning system 100 also includes a manager 102 configured to generate labeled training data 122 from network data 124 generated in response to a simulated cyberattack against the resources of the target network 112. The manager 102 coordinates the simulated cyberattacks. In some embodiments, the manager 102 coordinates simulated cyberattacks by labeling the simulation inputs based on configuration information that includes target network specifications (e.g., physical and virtual components, functional configuration, communication protocols, etc.) and attack specifications (e.g., attack scenario to be simulated against the target network specifications). In some embodiments, the configuration information for simulating a cyberattack can be provided by a network security administrator who configures the manager 120.

The manager 102 initiates a simulated cyberattack against the target network 112 by providing target network specifications and attack specifications to the attack simulator 104. In response, the attack simulator 104 executes the simulated cyberattack against the target network 112. In some embodiments, the attack simulator 104 uses breach and attack simulation (BAAS) tools to automate simulated cyberattacks against the target network 112. Generally, BAAS tools include an evolving repository of threat and attack techniques, such as malware, vulnerability exploits, web application attack samples, nation-state attack scenarios, and the like. Using BAAS tools to simulate cyberattacks against the resources of the target network 112 facilitates comprehensive and up-to-date attack data used to train the AI model 110. For example, vulnerability assessments, penetration testing, red and blue teaming, and other types of security testing generally do not cover every vulnerability of a computer network. Because cyberattacks can exploit these vulnerabilities, the cyberattacks may go undetected until the next scheduled vulnerability assessment or penetration test. The BAAS tools allow the attack simulator 104 to simulate full attack cycles (e.g., including insider threats, lateral movement, and data exfiltration) against the infrastructure of the target network 112, using software agents, virtual machines, and other resources. It should be appreciated that any attack capture file (e.g., attack data captured as part of an actual or simulated cyberattack) relevant to the target network 112 can be used to simulate a cyberattack against the target network 112.

As part of executing a simulated attack 130 against the target network 112, the attack simulator 104 sends details about the cyberattack (attack details 132) to the manager 102. The attack details 132 can include network infrastructure information for the target network 112, such as IP addresses, port numbers, resource names, and the like. The attack details 132 enable the manager 102 to distinguish network events associated with the simulated attack 130 from other network events occurring within the target network 112. More specifically, during and/or after the simulated attack 130, the manager 102 obtains log records (network data 124 and analytics data 126) generated by the resources of the target network 112 during the simulated attack 130, and the manager 102 uses the attack details 132 provided by the attack simulator 104 to distinguish attack data from non-attack data in the log records. As an example, target resource identifiers and timestamps in the network data 124 and analytics data 126 can be used to distinguish attack data from non-attack data. The attack data may be direct artifacts of the simulated attack 130. As a non-limiting example, the attack data can be: network traffic statistics (e.g., network session records between two hosts containing normalized internet protocol (IP) addresses, ports, byte and packet counts, and other data) and events received from security controls such as endpoint detection and response (EDR) components, firewalls, as well as other security controls and/or sensors. The attack data obtained from the network data 124 and analytics data 126 forms one or more attack log files containing log records associated with the simulated attack 130.

The manager 102 labels the log records in an attack log file as being malicious (e.g., labeled as a malware attack, data exfiltration attack, Advanced Persistent Threat (APT) attack, etc.). The manager 102 then provides the labeled attack log file as labeled training data 122 to the analytics 108, which trains the AI model 110 using the labeled training data 122 to identify cyber threats having characteristics that correspond to the labeled training data 122. Training the AI model 110 using the labeled training data 122 improves the AI model's ability to recognize cybersecurity threats and cyber risks by processing the data artifacts of the simulated attack 130 contained in the labeled training data 122 to determine relationships with threats like malicious files, suspicious IP addresses, and/or insider attacks.

Preferably, a simulated attack 130 is executed against the target network 112 to its completion, allowing the AI learning system 100 to obtain a complete dataset (attack log files) for the simulated attack 130. However, if the simulated attack 130 is blocked (e.g., by target network security controllers) prior to its completion, only a partial dataset (partial attack log file) for the attack scenario may be created, which may be insufficient for training the AI model 110 to identify each characteristic of the simulated attack 130. Therefore, to ensure a successful completion of the simulated attack, in some embodiments the simulated attack can be executed against replicated resources of the target network, which are located within an isolated environment, so as not to burden the actual resources of the target network, as described below in association with FIG. 2.

Figure 2:
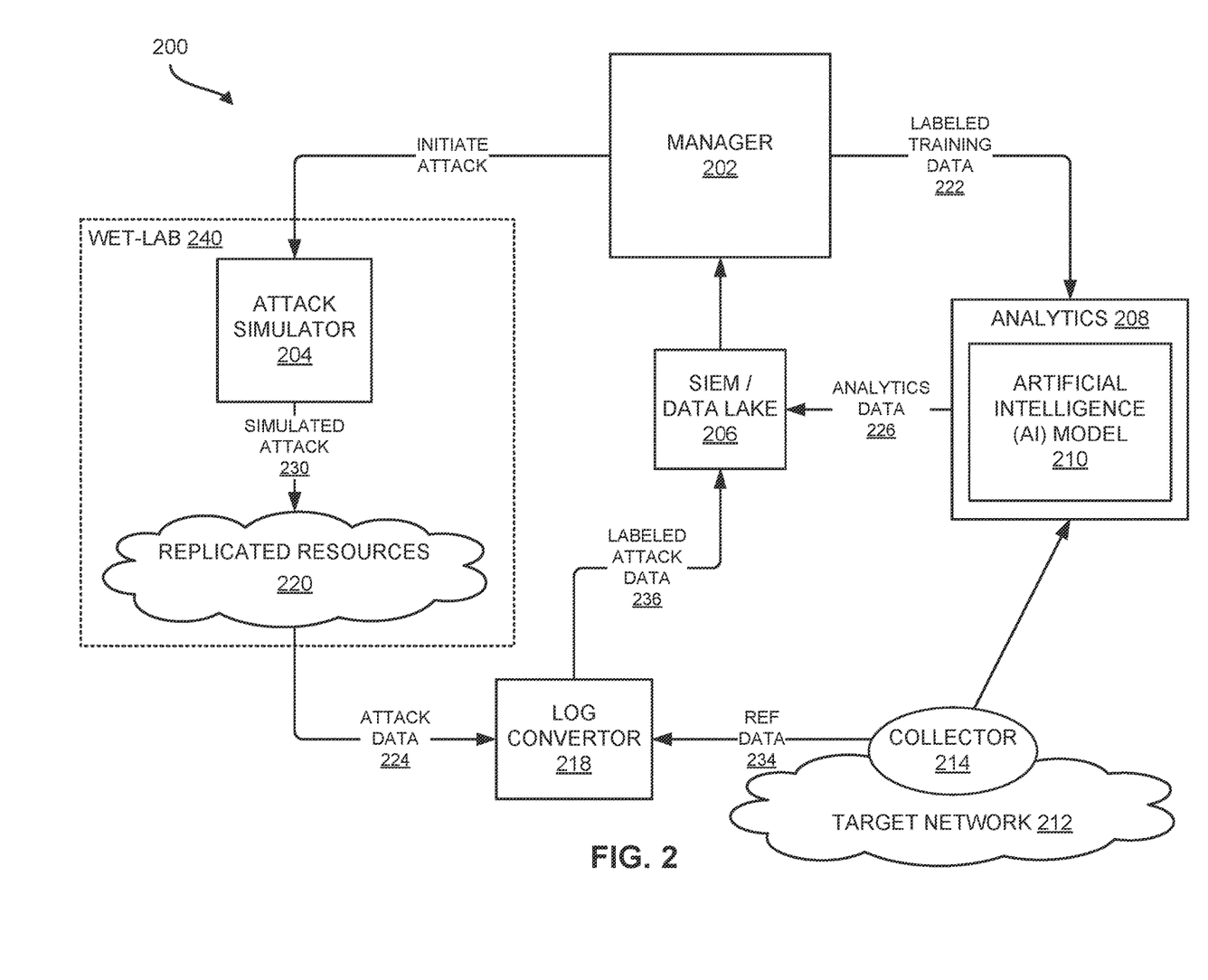
FIG. 2 is a block diagram that illustrates another example computational environment implementing an AI learning system that simulates cyberattacks against a representative network to generate labeled training data, in accordance with some embodiments of the present disclosure.

FIG. 2 is a block diagram that illustrates an example AI learning system 200 that simulates cyberattacks against replicated resources 220 of a target computer network to generate labeled training data 222, in accordance with some embodiments of the present disclosure. An example of a computing environment in which the AI learning system 200 can be implemented is shown and described later in association with FIG. 6.

As shown, the AI learning system 200 includes a collector 214, analytics 208, STEM/data lake 206, attack simulator 204, and manager 202. Generally, these components perform the same functionality described above in association with FIG. 1. In addition, the AI learning system 200 includes replicated resources 220 that is based on a target network 212 (e.g., an organization's enterprise network). A replicated resource 220 can be a duplicate of a target environment resource (e.g., duplicate hardware or software), a virtual resource in which virtualization is used to replicate a target network resource, or a combination thereof. Together, the replicated resources 220 can form a representative computing network. The replicated resources 220 can be contained within an isolated environment (e.g., cloud environment) to allow execution of a cyberattack against the replicated resources 220 without negatively impacting the target network 212.

Selecting which resources of the target network 212 to replicate can determine the quality of labeled training data 222 generated from a simulated attack 230, which consequently determines the quality of training of an AI model 210 to identify characteristics of the simulated attack 230. That is, the goal of executing a simulated attack 230 against the replicated resources 220 is to generate labeled training data 222 that provides analytics for detecting characteristics of the simulated attack 230 in the target network 212. If the resources (including protocols and other network information) of the target network 212 are not accurately represented by the replicated resources 220, anomalous data can be generated during a simulated attack 230, and the anomalous data can be inserted as noise into the labeled training data 222, resulting in non-optimal performance of the AI model 210. As an illustrative scenario, suppose that a network communication protocol used between two resources (e.g., virtual machines) in the target network 212 is not accurately represented during execution of a simulated attack 230, the resulting labeled training data 222 provided to the analytics 208 for training the AI model 210 may result in outlier scores assigned to normal network traffic between the two resources in the target network 212 when the AI model 210 is later implemented. Accordingly, the process of selecting which resources of the target network 212 to replicate can be based on an attack scenario used to simulate a cyberattack. The attack scenario can provide specifications for a type of attack to simulate, and the specifications can be used to select which resources of the target network 212 to replicate.

In some embodiments, the attack simulator 204 and the replicated resources 220 are contained within a wet-lab 240 computing environment (e.g., a computing environment that is isolated from external networks to prevent a cyberattack from spreading to an external network), in which the attack simulator 204 executes cyberattacks against the replicated resources 220 of the target network 212. For example, the manager 202 initiates a simulated cyberattack against the replicated resources 220 by providing attack specifications to the attack simulator 204. In response, the attack simulator 204 executes a simulated attack 230 against the replicated resources 220 using breach and attack simulation (BAAS) tools to automate the simulated attack 230 against the replicated resources 220. During the simulated attack 230, the replicated resources 220 generate attack data 224 (e.g., log records). The attack data 224 can contain information about resource usage patterns, activities, and operations that occurred during the simulated attack 230.

Figure 3:
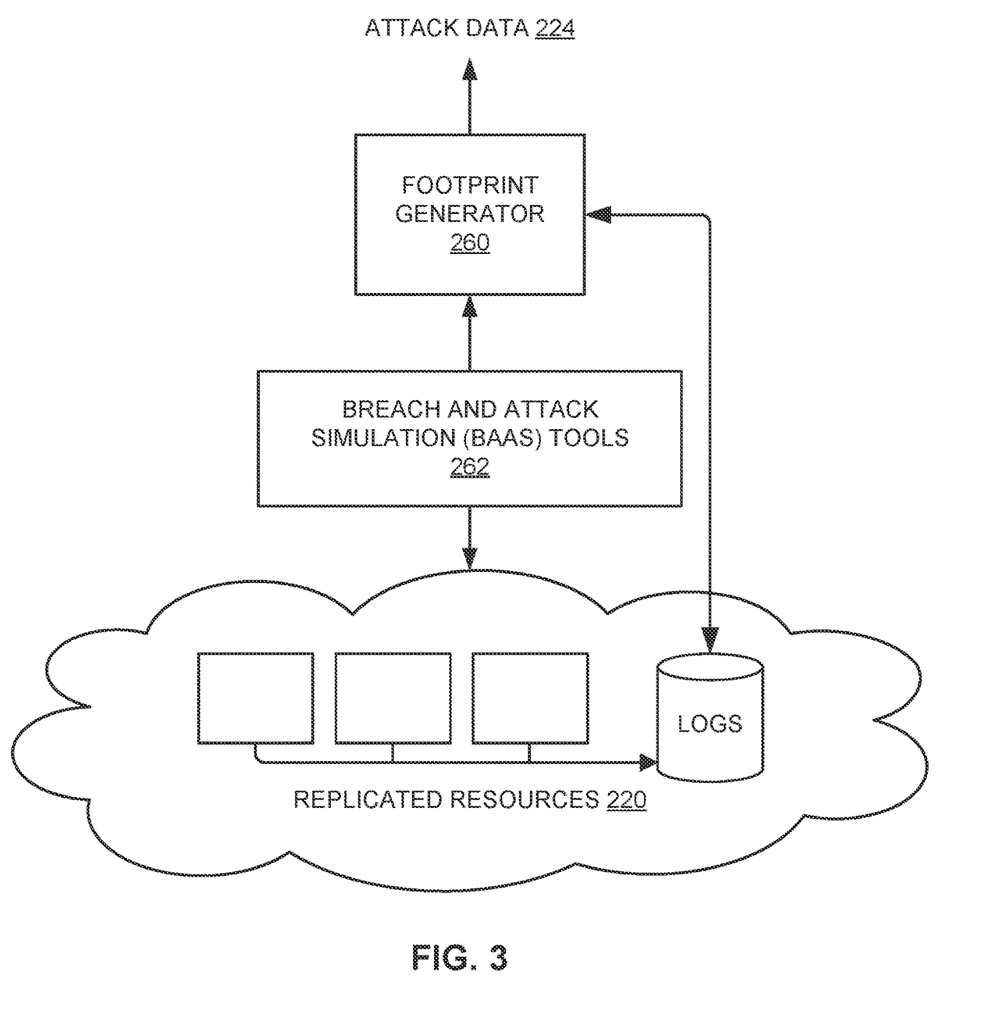
FIG. 3 is a block diagram illustrating an example system for generating attack data, in accordance with some embodiments of the present disclosure.

Referring generally to FIG. 2 and FIG. 3, in some embodiments, the wet-lab 240 contains a footprint generator 260 configured to generate attack data 224 (e.g., attack logs) within the wet-lab 240 environment. Footprinting is an ethical hacking technique used to find network vulnerabilities by gathering data about a specific targeted computer system to identify opportunities to penetrate the targeted computer system. The footprint generator 260 can be implemented as an application programming interface (API) with an endpoint exposed to one or more BAAS tools 262. Illustratively, the BAAS tools 262 can identify vulnerabilities in the target network 212 by mimicking attack paths and techniques used by malicious actors against the target network 212. For example, a breach simulation performed by the BAAS tools 262 can simulate malware attacks on endpoints, data exfiltration, malware attacks, and sophisticated advanced persistent threat (APT) attacks that move laterally through a network, targeting vulnerable network resources. As part of initiating a simulated attack on the replicated resources 220, the BAAS tools 262 provide API input to the footprint generator 260 that includes an attack configuration and data source information (e.g., endpoint detection and response (EDR), router(s), gateway(s), etc.). The footprint generator 260 utilizes the API input information to collect log records associated with the simulated attack and generate attack data 224 for the simulated attack. The footprint generator 260 outputs the attack data 224 to a log converter 218, shown in FIG. 2.

The log converter 218 obtains attack data 224 (attack log files) generated in the wet-lab 240 in association with a simulated attack 230. The log converter 218 uses the attack data 224 to generate labeled attack data 236 that corresponds to the specifications of the target network 212. For example, the log converter 218 can generate the labeled attack data 236 by labeling the log records obtained from the attack data 224 to indicate an association with a cyberattack, and modifying the log records to match the specifications of the target network 212.

Figure 4:
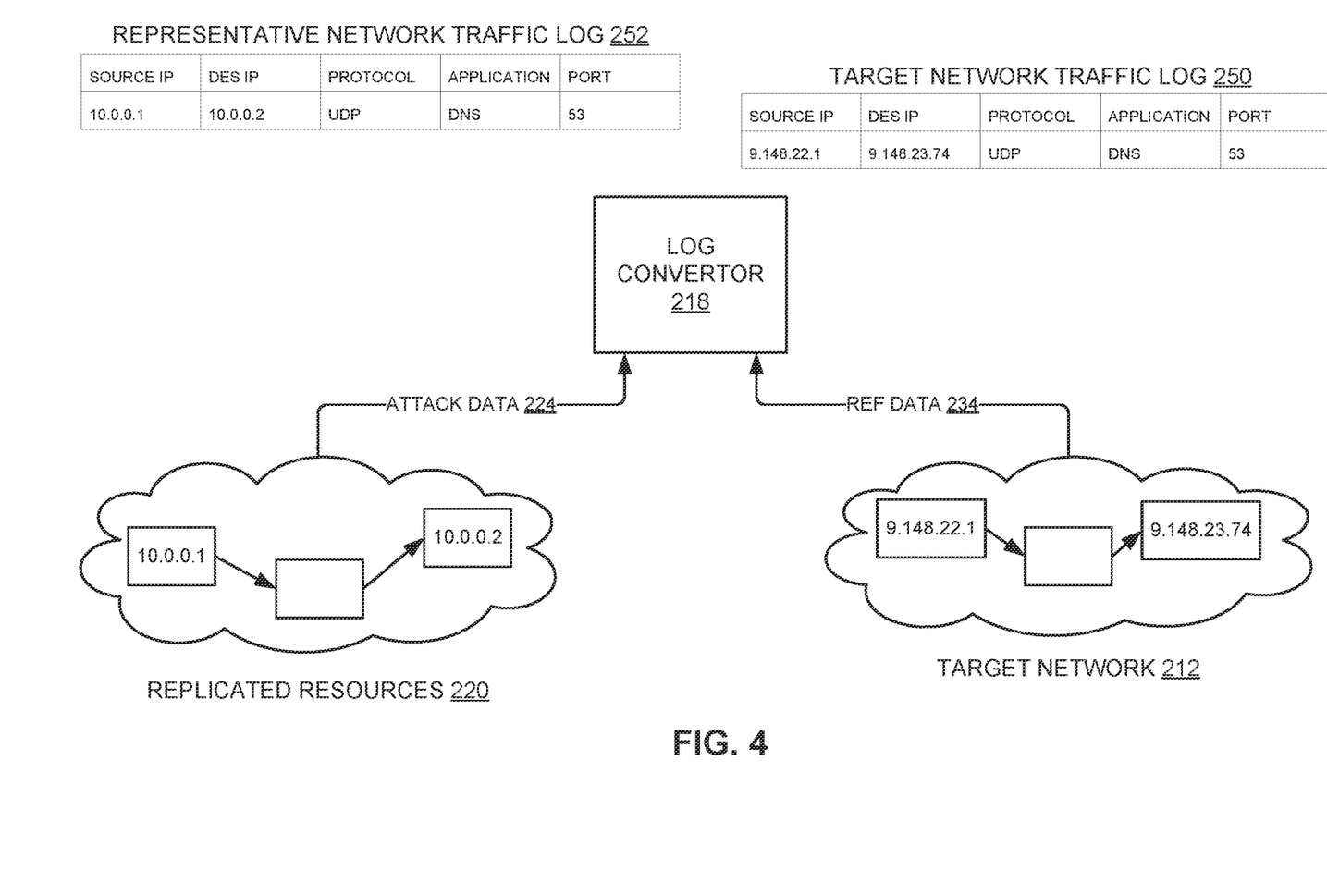
FIG. 4 illustrates modifying attack data to correspond to the specifications of a target computer network, in accordance with some embodiments of the present disclosure.

In some embodiments, the log converter 218 modifies the log records in the attack data 224 to correspond to the target network 212. In some embodiments, the log converter 218 obtains reference (REF) data 234 from the target network 212, which contains specifications of the target network 212, and modifies log records in the attack data 224 to contain the specifications obtained from the reference data 234, thereby making it appear as though the attack data 224 was generated within the target network 212. The reference data 234 can comprise non-attack data or benign data associated with normal activities executed within the target network 212. The reference data 234 can be obtained from a collector 214 configured to collect network data (e.g., network log files) from the network infrastructure (e.g., switches and routers) of the target network 212. Referring generally to both FIG. 2 and FIG. 4, as an example directed to attack data 224 comprising network traffic logs, the log converter 218 obtains attack data 224 (a representative network traffic record 252) from the replicated resources 220, and obtains reference data 234 (a target network traffic record 250) from the target network 212. The target network resource associated with the target network traffic record 250 can correspond to the representative network resource associated with the representative network traffic record 252. The log converter 218 then modifies the information from the representative network traffic record 252 (e.g., source IP and destination IP) to correspond to the information in the target network traffic record 250. Modifying the information from the representative network traffic record 252 to correspond to the specifications of the target network 212 allows the resulting labeled attack data 236 to be used to train the AI model 210 within the context of the target network 212.

In some embodiments, after labeling and modifying the attack data 224 to form labeled attack data 236, the log converter 218 provides the labeled attack data 236 to the STEM and/or data lake 206 to allow the labeled attack data 236 to be included in a stream of labeled training data 222 sent from the manager 202 to the analytics 208 component of the target network 212 to be used to train the AI model 210. In other embodiments, the log converter 218 can bypass the STEM and/or data lake 206 and send the labeled attack data 236 directly to the manager 202, which sends the labeled training data 222 to the analytics 208 for training of the AI model 210.

In some embodiments, the AI model 210 can be adaptively trained to further improve detection of a cyberattack in the target network 212. For example, deficiencies in the AI model's ability to detect certain aspects of a cyberattack can be identified, and the manager 202 can initiate an additional simulated attack that is configured based on the detection deficiencies identified. Labeled training data 222 generated via the additional simulated attack can address the aspects of the cyberattack that may have been missed by the initial training of the AI model 210, and the labeled training data 222 can be used to adaptively train the AI model 210 to detect the aspects of the cyberattack missed in the initial training.

The AI learning systems described in association with FIG. 1 and FIG. 2 can be scaled for any analytics system that utilizes labeled training data as feedback to an analytics component to train an AI model to identify characteristics of a cyberattack. Also, in addition to network traffic analysis models that aim to prevent attacks having a network signature, the AI learning system shown and described above can be adapted to any target network data source which senses and collects different types of information associated with a cyber threat.

The AI learning systems illustrated and described above can comprise cognitive security computing, which utilizes various forms of AI, including machine-learning algorithms and deep-learning networks, that adaptively improve cyber threat detection over time. As such, it is important to understand how these cognitive systems can be implemented, although it should be appreciated that the mechanisms described herein are only examples and are not intended to state or imply any limitation with regard to the type of cognitive system mechanisms with which the illustrative embodiments are implemented.

As an overview, a cognitive system is a specialized computer system, or set of computer systems, configured with hardware and/or software logic (in combination with hardware logic upon which the software executes) to emulate human cognitive functions. These cognitive systems apply human-like characteristics to conveying and manipulating ideas which, when combined with the inherent strengths of digital computing, can solve problems with high accuracy and resilience on a large scale, which could not otherwise be performed by a human. A cognitive system performs one or more computer-implemented cognitive operations that approximate a human thought process, as well as enable humans and machines to interact in a more natural manner so as to extend and magnify human expertise and cognition. A cognitive system comprises artificial intelligence logic, such as search and optimization (e.g., intelligently searching through many possible solutions), for example, and machine learning logic, which may be provided as specialized hardware, software executed on hardware, or any combination of specialized hardware and software executed on hardware. The logic of the cognitive system implements the cognitive operation(s), examples of which include, but are not limited to, identifying threats like malicious files, suspicious IP addresses, malware, ransomware, or suspicious insider activities.

It should be appreciated that while a cognitive system may attempt to emulate human thought processes, the algorithms, operations, and configurations of the cognitive system are not the same as a human brain due to the fact that computing devices simply do not have the same architecture as a human mind and operate in a completely different way fundamentally, requiring specific configurations and logic that perform operations that a human brain does not perform, in order to emulate the results that a human brain generates. In other words, computers are not human brains, currently there is no complete understanding of how human brains operate, and thus, the human thought processes themselves cannot be duplicated, but only emulated and approximated via completely different mechanisms present in computing devices.

IBM WATSON® is one example of a cognitive system which can perform cognitive security with high accuracy at speeds far faster than human beings and on a larger scale. Illustratively, such cognitive systems are able to perform functions that include: ingesting and processing of vast amounts of structured and unstructured data; generating and evaluating a hypothesis; weighing and evaluating responses that are based on relevant evidence; providing situation-specific advice, insights, and guidance; improving knowledge and learning with each iteration and interaction through machine learning processes; enabling decision making at the point of impact (contextual guidance); scaling in proportion to a task; extending and magnifying human expertise and cognition; retaining a high degree of relevant recollection from data points; as well as other functions not specifically mentioned here.

Figure 5:
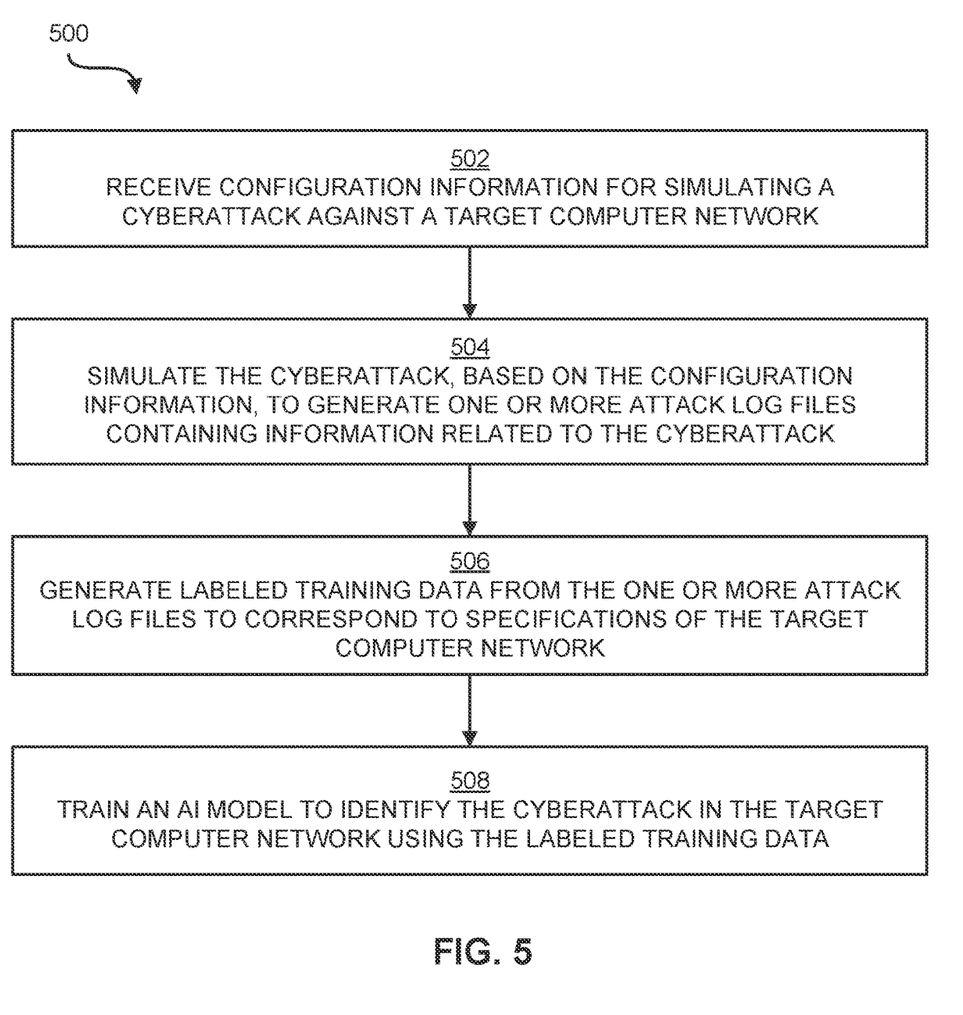
FIG. 5 is a flow diagram illustrating an example method for automated generation of labeled datasets for training an AI model to identify a cyberattack, in accordance with some embodiments of the present disclosure.

FIG. 5 is a flow diagram illustrating an example method 500 for automated generation of labeled datasets for training an AI model to identify a cyberattack, in accordance with some embodiments of the present disclosure. More specifically, a cyberattack can be simulated against the resources of a target computer network (e.g., an organization's enterprise network) to cause the resources to generate one or more attack log files containing information related to the cyberattack, which can be used to generate labeled datasets for training in an AI learning system.

Starting with operation 502, the method 500 receives configuration information for simulating a cyberattack against a target computer network. In some embodiments, key resources of the target computing network can be replicated, and instead of executing the cyberattack against the actual resources of the target computer network, the simulated cyberattack can be executed against the replicated resources of the target network so as not to burden the actual resources of the target computer network. The configuration information for simulating the cyberattack can specify an attack scenario directed to one or more resources of the target computer network (e.g., an attack configuration and data source information for the target computer network, such as EDR(s), router(s), gateway(s), etc.). In some embodiments, the configuration information for the simulated cyberattack can be provided by a network security administrator of the target computer network.

Operation 504 simulates the cyberattack, based on the configuration information, to generate one or more attack log files containing information related to the cyberattack. More specifically, the cyberattack can be executed against the resources of the target computer network (which can comprise replicated resources), and in response, the resources of the target computer network generate log records stored in log files containing artifacts of the simulated cyberattack. The artifacts of the simulated cyberattack can include, but are not limited to: network traffic statistics (e.g., network session records between two hosts containing normalized IP addresses, ports, byte and packet counts, and other data) and events received from security controls (e.g., EDRs, firewalls, and other security controls and/or sensors). The log files containing the log records generated by the resources of the target computer network during the simulated cyberattack comprise attack log files.

In some embodiments, the method 500 utilizes BAAS tools to simulate the cyberattack against the target computer network. The BAAS tools can be configured to identify vulnerabilities in the target computer network using techniques employed by malicious actors, such as malware attacks, data exfiltration attacks, and APT attacks. In some embodiments, footprinting can be used to find network vulnerabilities in the targeted computer system. For example, a footprint generator can be used in combination with BAAS tools to simulate a cyberattack against the target computer network and generate network logs associated with the simulated cyberattack. The footprint generator can then generate attack log files from the network logs created during the simulated cyberattack.

Operation 506 generates labeled training data from one or more attack log files created during the simulated cyberattack. The labeled training data is generated to correspond to the specifications of the target computer network (e.g., IP addresses, ports, naming conventions, etc.), and the labels assigned to the log records indicate an association with the cyberattack (e.g., label as a malware attack, data exfiltration attack, APT attack, etc.).

In embodiments where resources of the target computer network are replicated to form a representative network, some specifications of the representative network may not match the specifications of the target computing network. For example, IP addresses and port numbers in the representative computer network may be different from the IP addresses and port numbers used in the target computer network. As such, log records obtained from the attack logs can be modified to correspond to the specifications of the target computer network. As an example, log records generated in the target computer network can be obtained, and specifications for the target computer network (e.g., IP addresses and port numbers) can be extracted from the log records. The specifications obtained from the log records can replace specifications in attack log records, so that the attack log records correspond to the specifications of the target computer network, thereby generating labeled training data that can be used to train the AI model within the context of the target computer network. Also, other aspects of the attack log records can be modified to achieve various AI training objectives. For example, timestamps of attack log records can be modified to correspond to a defined time (e.g., date and/or time) for which a security administrator wants to train an AI model to detect a cyberattack (e.g., specific cyberattacks that may be activated and/or identified at a specific time).

In some embodiments, the labeled training data can be merged with non-attack log records generated in the target computer network, thereby forming a training data stream containing both labeled attack data and non-attack data that can be input to the AI learning system of the target computer network. For example, non-attack log records generated in the target computer network can be obtained from a collector component in the target computer network, where the non-attack log records may be associated with non-attack events in the target computer network. The log records can then be merged with attack log records to form the labeled training data. In some embodiments, the log records associated with non-attack events can be labeled to further facilitate training of the AI model.

Operation 508 trains the AI model to identify the cyberattack in the target computer network using the labeled training data. In some embodiments, the labeled training data can be provided to an analytics component of the AI learning system, which includes the labeled training data in a stream of feedback data used to train the AI model. After training the AI model (or as part of adaptively training of the AI model), the AI model can monitor the target network to detect the cyberattack, and block or minimize cyberattack, within the target network. In some embodiments, the AI model can be adaptively trained to improve detection of the cyberattack in the target computer network by executing additional cyberattack simulations based on detection deficiencies identified in the AI model. The additional simulations can generate supplemental labeled training data that can be used to adaptively train the AI model. After training the AI model (or as part of adaptively training of the AI model), the AI model can monitor events in the target network to detect the cyberattack, and block or minimize cyberattack, within the target network.

The method 500 described above can be performed by a computer (e.g., computer 601 in FIG. 6), performed in a cloud environment (e.g., clouds 606 or 605 in FIG. 6), and/or generally can be implemented in fixed-functionality hardware, configurable logic, logic instructions, etc., or any combination thereof. Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random-access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 6:
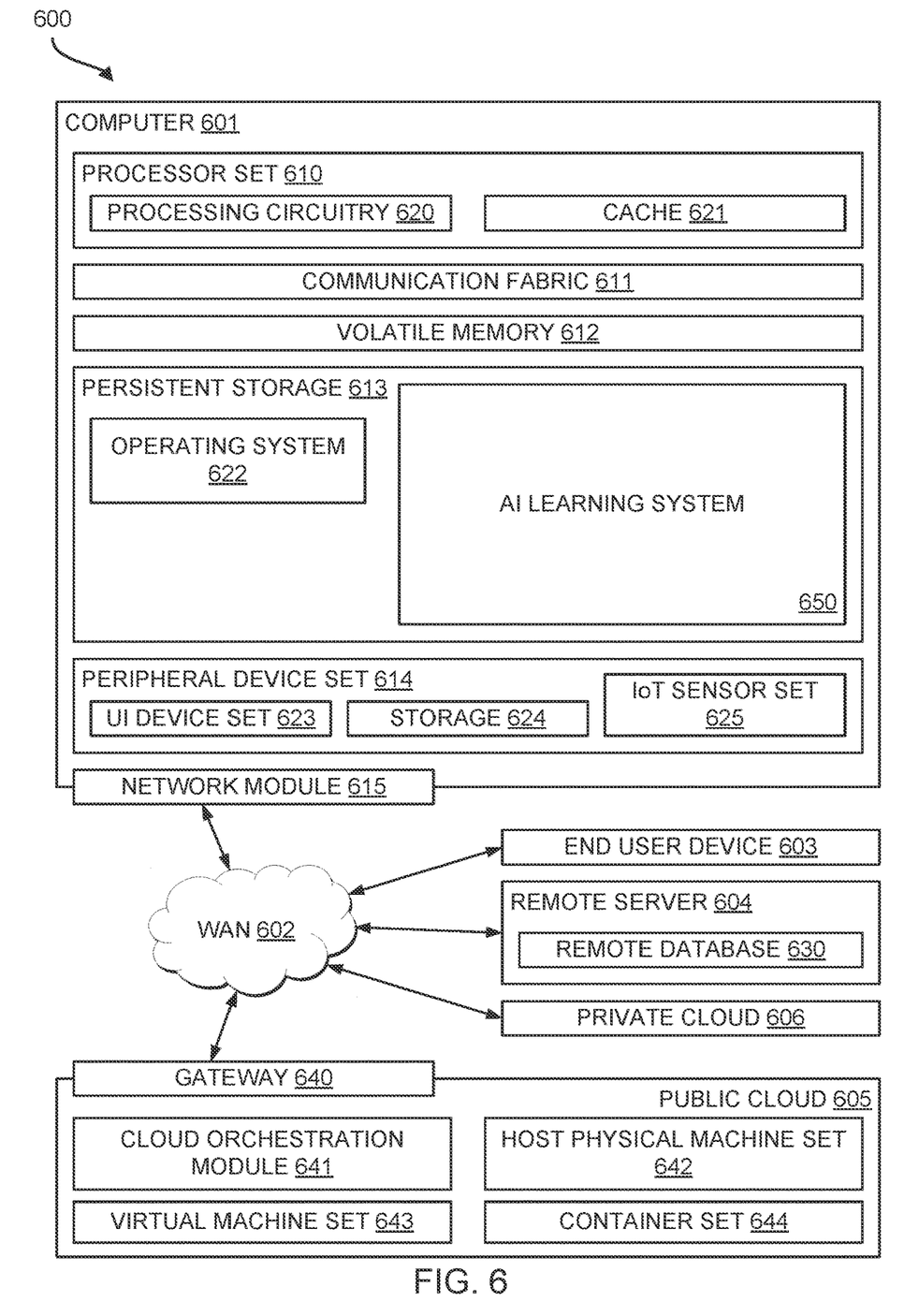
FIG. 6 is a block diagram that illustrates an example computing environment in which aspects of the present disclosure can be implemented, in accordance with some embodiments of the present disclosure.

Computing environment 600 contains an example of an environment for the execution of at least some of the computer code involved in performing the inventive methods, such as computer code for an AI learning system, shown in block 650, which simulates cyberattacks against a target computing network to generate labeled training data for training an AI model to recognize characteristics of the cyberattacks. In addition to block 650, computing environment 600 includes, for example, computer 601, wide area network (WAN) 602, end user device (EUD) 603, remote server 604, public cloud 605, and private cloud 606. In this embodiment, computer 601 includes processor set 610 (including processing circuitry 620 and cache 621), communication fabric 611, volatile memory 612, persistent storage 613 (including operating system 622 and block 650, as identified above), peripheral device set 614 (including user interface (UI), device set 623, storage 624, and Internet of Things (IoT) sensor set 625), and network module 615. Remote server 604 includes remote database 630. Public cloud 605 includes gateway 640, cloud orchestration module 641, host physical machine set 642, virtual machine set 643, and container set 644.

COMPUTER 601 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 630. As is well understood in the art of computer technology, and depending upon the technology, performance of a computer-implemented method may be distributed among multiple computers and/or between multiple locations. On the other hand, in this presentation of computing environment 600, detailed discussion is focused on a single computer, specifically computer 601, to keep the presentation as simple as possible. Computer 601 may be located in a cloud, even though it is not shown in a cloud in FIG. 6. On the other hand, computer 601 is not required to be in a cloud except to any extent as may be affirmatively indicated.

PROCESSOR SET 610 includes one, or more, computer processors of any type now known or to be developed in the future. Processing circuitry 620 may be distributed over multiple packages, for example, multiple, coordinated integrated circuit chips. Processing circuitry 620 may implement multiple processor threads and/or multiple processor cores. Cache 621 is memory that is located in the processor chip package(s) and is typically used for data or code that should be available for rapid access by the threads or cores running on processor set 610. Cache memories are typically organized into multiple levels depending upon relative proximity to the processing circuitry. Alternatively, some, or all, of the cache for the processor set may be located "off chip." In some computing environments, processor set 610 may be designed for working with qubits and performing quantum computing.

Computer readable program instructions are typically loaded onto computer 601 to cause a series of operational steps to be performed by processor set 610 of computer 601 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 621 and the other storage media discussed below. The computer readable program instructions, and associated data, are accessed by processor set 610 to control and direct performance of the inventive methods. In computing environment 600, at least some of the instructions for performing the inventive methods may be stored in block 650 in persistent storage 613.

COMMUNICATION FABRIC 611 is the signal conduction paths that allow the various components of computer 601 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 612 is any type of volatile memory now known or to be developed in the future. Examples include dynamic type random access memory (RAM) or static type RAM. Typically, the volatile memory is characterized by random access, but this is not required unless affirmatively indicated. In computer 601, the volatile memory 612 is located in a single package and is internal to computer 601, but, alternatively or additionally, the volatile memory may be distributed over multiple packages and/or located externally with respect to computer 601.

PERSISTENT STORAGE 613 is any form of non-volatile storage for computers that is now known or to be developed in the future. The non-volatility of this storage means that the stored data is maintained regardless of whether power is being supplied to computer 601 and/or directly to persistent storage 613. Persistent storage 613 may be a read only memory (ROM), but typically at least a portion of the persistent storage allows writing of data, deletion of data and re-writing of data. Some familiar forms of persistent storage include magnetic disks and solid-state storage devices. Operating system 622 may take several forms, such as various known proprietary operating systems or open-source Portable Operating System Interface type operating systems that employ a kernel. The code included in block 650 typically includes at least some of the computer code involved in performing the inventive methods.

PERIPHERAL DEVICE SET 614 includes the set of peripheral devices of computer 601. Data communication connections between the peripheral devices and the other components of computer 601 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 623 may include components such as a display screen, speaker, microphone, wearable devices (such as goggles and smart watches), keyboard, mouse, printer, touchpad, game controllers, and haptic devices. Storage 624 is external storage, such as an external hard drive, or insertable storage, such as an SD card. Storage 624 may be persistent and/or volatile. In some embodiments, storage 624 may take the form of a quantum computing storage device for storing data in the form of qubits. In embodiments where computer 601 is required to have a large amount of storage (for example, where computer 601 locally stores and manages a large database) then this storage may be provided by peripheral storage devices designed for storing very large amounts of data, such as a storage area network (SAN) that is shared by multiple, geographically distributed computers. IoT sensor set 625 is made up of sensors that can be used in Internet of Things applications. For example, one sensor may be a thermometer and another sensor may be a motion detector.

NETWORK MODULE 615 is the collection of computer software, hardware, and firmware that allows computer 601 to communicate with other computers through WAN 602. Network module 615 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 615 are performed on the same physical hardware device. In other embodiments (for example, embodiments that utilize software-defined networking (SDN)), the control functions and the forwarding functions of network module 615 are performed on physically separate devices, such that the control functions manage several different network hardware devices. Computer readable program instructions for performing the inventive methods can typically be downloaded to computer 601 from an external computer or external storage device through a network adapter card or network interface included in network module 615.

WAN 602 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers, and edge servers.

END USER DEVICE (EUD) 603 is any computer system that is used and controlled by an end user (for example, a customer of an enterprise that operates computer 601), and may take any of the forms discussed above in connection with computer 601. EUD 603 typically receives helpful and useful data from the operations of computer 601. For example, in a hypothetical case where computer 601 is designed to provide a recommendation to an end user, this recommendation would typically be communicated from network module 615 of computer 601 through WAN 602 to EUD 603. In this way, EUD 603 can display, or otherwise present, the recommendation to an end user. In some embodiments, EUD 603 may be a client device, such as thin client, heavy client, mainframe computer, desktop computer and so on.

REMOTE SERVER 604 is any computer system that serves at least some data and/or functionality to computer 601. Remote server 604 may be controlled and used by the same entity that operates computer 601. Remote server 604 represents the machine(s) that collect and store helpful and useful data for use by other computers, such as computer 601. For example, in a hypothetical case where computer 601 is designed and programmed to provide a recommendation based on historical data, then this historical data may be provided to computer 601 from remote database 630 of remote server 604.

PUBLIC CLOUD 605 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 605 is performed by the computer hardware and/or software of cloud orchestration module 641. The computing resources provided by public cloud 605 are typically implemented by virtual computing environments that run on various computers making up the computers of host physical machine set 642, which is the universe of physical computers in and/or available to public cloud 605. The virtual computing environments (VCEs) typically take the form of virtual machines from virtual machine set 643 and/or containers from container set 644. It is understood that these VCEs may be stored as images and may be transferred among and between the various physical machine hosts, either as images or after instantiation of the VCE. Cloud orchestration module 641 manages the transfer and storage of images, deploys new instantiations of VCEs and manages active instantiations of VCE deployments. Gateway 640 is the collection of computer software, hardware, and firmware that allows public cloud 605 to communicate through WAN 602.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 606 is similar to public cloud 605, except that the computing resources are only available for use by a single enterprise. While private cloud 606 is depicted as being in communication with WAN 602, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 605 and private cloud 606 are both part of a larger hybrid cloud.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used and logical, mechanical, electrical, and other changes can be made without departing from the scope of the various embodiments. In the previous description, numerous specific details were set forth to provide a thorough understanding the various embodiments. But the various embodiments can be practiced without these specific details. In other instances, well-known circuits, structures, and techniques have not been shown in detail in order not to obscure embodiments.

Different instances of the word "embodiment" as used within this specification do not necessarily refer to the same embodiment, but they can. Any data and data structures illustrated or described herein are examples only, and in other embodiments, different amounts of data, types of data, fields, numbers and types of fields, field names, numbers and types of rows, records, entries, or organizations of data can be used. In addition, any data can be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

Any advantages discussed in the present disclosure are example advantages, and embodiments of the present disclosure can exist that realize all, some, or none of any of the discussed advantages while remaining within the spirit and scope of the present disclosure.

What is claimed is:

1. A computer-implemented method comprising:
   receiving configuration information for simulating a cyberattack against a target computer network;
   executing a cyberattack simulation, based on the configuration information, against the target computer network, wherein log files containing information related to the cyberattack simulation are generated by resources of the target computer network in response to the cyberattack simulation;
   analyzing the log files to distinguish attack log records associated with the cyberattack simulation from non-attack log records;
   generating labeled training data from the attack log records to correspond to specifications of the target computer network, wherein the attack log records from the log files matching the specifications of the target computer network are labeled to indicate an association with the cyberattack; and
   training an artificial intelligence (AI) model to identify the cyberattack in the target computer network using the labeled training data.

2. The computer-implemented method of claim 1, wherein the configuration information for simulating the cyberattack specifies an attack scenario directed to one or more of the resources of the target computer network.

3. The computer-implemented method of claim 1, wherein executing the cyberattack simulation further comprises creating an isolated environment containing replicated resources of the target computer network.

4. The computer-implemented method of claim 3, wherein one or more resources of the target computer network selected for replication in the isolated environment are determined using the configuration information for simulating the cyberattack.

5. The computer-implemented method of claim 3, wherein generating the labeled training data further comprises:
   obtaining the specifications of the target computer network from one or more log files generated within the target computer network; and
   modifying the attack log records generated by the replicated resources in the isolated environment to correspond to the specifications of the target computer network.

6. The computer-implemented method of claim 1, wherein executing the cyberattack simulation further comprises performing the cyberattack simulation using one or more breach and attack simulation tools.

7. The computer-implemented method of claim 1, further comprising adaptively training the AI model to improve detection of the cyberattack in the target computer network, wherein additional cyberattack simulations are executed based on detection deficiencies identified in the AI model to generate supplemental labeled training data, and the AI model is adaptively trained using the supplemental labeled training data.

8. A system comprising:
   one or more computer readable storage media storing program instructions and one or more processors which, in response to executing the program instructions, are configured to:
   receive configuration information for simulating a cyberattack against a target computer network;
   execute a cyberattack simulation, based on the configuration information, against the target computer network, wherein log files containing information related to the cyberattack simulation are generated by resources of the target computer network in response to the cyberattack simulation;
   analyze the log files to distinguish attack log records associated with the cyberattack simulation from non-attack log records;
   generate labeled training data from the attack log records to correspond to specifications of the target computer network, wherein the attack log records from the log files matching the specifications of the target computer network are labeled to indicate an association with the cyberattack; and
   train an artificial intelligence (AI) model to identify the cyberattack in the target computer network using the labeled training data.

9. The system of claim 8, wherein the configuration information for simulating the cyberattack specifies an attack scenario directed to one or more of the resources of the target computer network.

10. The system of claim 8, wherein the program instructions configured to cause the one or more processors to execute the cyberattack simulation are further configured to cause the one or more processors to:
    create an isolated environment containing replicated resources of the target computer network.

11. The system of claim 10, wherein the program instructions configured to cause the one or more processors to generate the labeled training data are further configured to cause the one or more processors to:
    obtain the specifications of the target computer network from one or more log files generated within the target computer network; and
    modify the attack log records generated by the replicated resources in the isolated environment to correspond to the specifications of the target computer network.

12. The system of claim 10, wherein one or more resources of the target computer network selected for replication in the isolated environment are determined using the configuration information for simulating the cyberattack.

13. The system of claim 8, wherein the program instructions configured to cause the one or more processors to execute the cyberattack simulation are further configured to cause the one or more processors to:
    perform the cyberattack simulation using one or more breach and attack simulation tools.

14. The system of claim 8, wherein the program instructions configured to cause the one or more processors to generate the labeled training data are further configured to cause the one or more processors to:

merge the labeled training data with log records generated within the target computer network that are associated with non-attack events.

15. The system of claim 8, wherein the program instructions are further configured to cause the one or more processors to:
adaptively train the AI model to improve detection of the cyberattack in the target computer network,
wherein additional cyberattack simulations are executed based on detection deficiencies identified in the AI model to generate supplemental labeled training data, and the AI model is adaptively trained using the supplemental labeled training data.

16. A computer program product comprising:
one or more computer readable storage media, and program instructions collectively stored on the one or more computer readable storage media, the program instructions configured to cause one or more processors to:
receive configuration information for simulating a cyberattack against a target computer network;
execute a cyberattack simulation, based on the configuration information, against the target computer network, wherein log files containing information related to the cyberattack simulation are generated by resources of the target computer network in response to the cyberattack simulation;
analyze the log files to distinguish attack log records associated with the cyberattack simulation from non-attack log records;
generate labeled training data from the attack log records to correspond to specifications of the target computer network, wherein the attack log records from the log files matching the specifications of the target computer network are labeled to indicate an association with the cyberattack; and
train an artificial intelligence (AI) model to identify the cyberattack in the target computer network using the labeled training data.

17. The computer program product of claim 16, wherein the program instructions configured to cause the one or more processors to execute the cyberattack simulation are further configured to cause the one or more processors to:
create an isolated environment containing replicated resources of the target computer network.

18. The computer program product of claim 17, wherein the program instructions configured to cause the one or more processors to generate the labeled training data are further configured to cause the one or more processors to:
obtain the specifications of the target computer network from one or more log files generated within the target computer network; and
modify the attack log records generated by the replicated resources in the isolated environment to correspond to the specifications of the target computer network.

19. The computer program product of claim 16, wherein the program instructions configured to cause the one or more processors to execute the cyberattack simulation are further configured to cause the one or more processors to:
perform the cyberattack simulation using one or more breach and attack simulation tools.

20. The computer program product of claim 16, wherein the program instructions are further configured to cause the one or more processors to:
adaptively train the AI model to improve detection of the cyberattack in the target computer network,
wherein additional cyberattack simulations are executed based on detection deficiencies identified in the AI model to generate supplemental labeled training data, and the AI model is adaptively trained using the supplemental labeled training data.

* * * * *